United States Patent
Kuroda

(10) Patent No.: US 11,341,714 B2
(45) Date of Patent: May 24, 2022

(54) INFORMATION SERVICE SYSTEM AND INFORMATION SERVICE METHOD

(71) Applicant: INFORMATION SYSTEM ENGINEERING INC., Tokyo (JP)

(72) Inventor: Satoshi Kuroda, Tokyo (JP)

(73) Assignee: INFORMATION SYSTEM ENGINEERING INC., Toko (JP)

( * ) Notice: Subject to any disclaimer, the term of this patent is extended or adjusted under 35 U.S.C. 154(b) by 339 days.

(21) Appl. No.: 16/604,079

(22) PCT Filed: Jul. 22, 2019

(86) PCT No.: PCT/JP2019/028626
§ 371 (c)(1),
(2) Date: Oct. 9, 2019

(87) PCT Pub. No.: WO2020/026871
PCT Pub. Date: Feb. 6, 2020

(65) Prior Publication Data
US 2021/0166468 A1 Jun. 3, 2021

(30) Foreign Application Priority Data
Jul. 31, 2018 (JP) .............................. JP2018-144513

(51) Int. Cl.
*G06T 15/20* (2011.01)
*G06T 19/00* (2011.01)
(Continued)

(52) U.S. Cl.
CPC .......... *G06T 15/205* (2013.01); *G02B 27/017* (2013.01); *G06N 20/00* (2019.01);
(Continued)

(58) Field of Classification Search
None
See application file for complete search history.

(56) References Cited

U.S. PATENT DOCUMENTS 8,196,212 B2   6/2012   Tsusaka et al.
8,442,268 B2   5/2013   Isogai et al.
(Continued)

FOREIGN PATENT DOCUMENTS

CN   1532621 A      9/2004
CN   101855633 A   10/2010
(Continued)

OTHER PUBLICATIONS

Related U.S. Appl. No. 16/765,130; First Named Inventor: Satoshi Kuroda; Title: "Information Providing System and Information Providing Method"; filed May 18, 2020.
(Continued)

*Primary Examiner* — Tapas Mazumder
(74) *Attorney, Agent, or Firm* — Holtz, Holtz & Volek PC

(57) ABSTRACT

An information service system includes a unit which acquires first image information from a user terminal, a scene model database which stores past first image information, scene information containing a scene ID, and scene relevance, an evaluation unit which acquires a scene ID list, a unit which creates a scene name list corresponding to the scene ID list, a unit which acquires target information containing a set of second image information and a first scene ID, a content model database which stores past target information containing a set of past second image information and a scene ID, a reference ID, and a content relevance, a unit which acquires a reference ID list, a unit which creates a reference summary list, a unit which acquires a first reference ID selected from the reference summary list, and a unit which outputs the content corresponding to the acquired first reference ID.

20 Claims, 16 Drawing Sheets

(51) Int. Cl.
*G06N 20/00* (2019.01)
*G02B 27/01* (2006.01)
*H04N 21/231* (2011.01)
*H04N 21/2743* (2011.01)
*H04N 21/472* (2011.01)

(52) U.S. Cl.
CPC ...... *G06T 19/006* (2013.01); *H04N 21/23109* (2013.01); *H04N 21/2743* (2013.01); *H04N 21/47202* (2013.01)

(56) References Cited

U.S. PATENT DOCUMENTS

| | | |
|---|---|---|
| 8,799,401 B1 | 8/2014 | Bryar et al. |
| 9,164,506 B1 | 10/2015 | Zang |
| 10,643,073 B2 | 5/2020 | Sugaya |
| 2003/0126129 A1 | 7/2003 | Watson |
| 2004/0183918 A1 | 9/2004 | Squilla et al. |
| 2004/0230564 A1 | 11/2004 | Simon et al. |
| 2005/0171661 A1 | 8/2005 | Abdel-Malek et al. |
| 2006/0123000 A1 | 6/2006 | Baxter et al. |
| 2006/0287993 A1 | 12/2006 | Yao et al. |
| 2007/0188626 A1 | 8/2007 | Squilla et al. |
| 2008/0028362 A1 | 1/2008 | Ugai et al. |
| 2008/0120282 A1 | 5/2008 | Liberty et al. |
| 2009/0265313 A1 | 10/2009 | Wang |
| 2011/0093449 A1 | 4/2011 | Belenzon et al. |
| 2011/0222832 A1* | 9/2011 | Aizawa ............ H04N 21/42204 386/200 |
| 2011/0243453 A1 | 10/2011 | Kashima et al. |
| 2012/0075343 A1 | 3/2012 | Chen et al. |
| 2012/0086792 A1* | 4/2012 | Akbarzadeh ....... H04N 1/32096 348/77 |
| 2012/0209470 A1 | 8/2012 | Gilbert et al. |
| 2013/0138696 A1 | 5/2013 | Turdakov et al. |
| 2013/0215264 A1 | 8/2013 | Soatto et al. |
| 2013/0266228 A1 | 10/2013 | Markson et al. |
| 2014/0009476 A1* | 1/2014 | Venkitaraman .... H04N 21/4307 345/502 |
| 2014/0355879 A1 | 12/2014 | Agosta et al. |
| 2015/0253977 A1 | 9/2015 | Kang |
| 2016/0019212 A1* | 1/2016 | Soldani .................. G06Q 10/20 345/633 |
| 2016/0026900 A1 | 1/2016 | Ando |
| 2016/0287987 A1 | 10/2016 | Onda et al. |
| 2016/0342681 A1 | 11/2016 | Kesin |
| 2017/0124447 A1 | 5/2017 | Chang et al. |
| 2017/0344958 A1 | 11/2017 | Lumera et al. |
| 2018/0101791 A1 | 4/2018 | Viswanathan |
| 2019/0019166 A1 | 1/2019 | Vahid |
| 2019/0045158 A1 | 2/2019 | Osanai et al. |
| 2019/0108411 A1 | 4/2019 | Liu et al. |
| 2019/0163975 A1 | 5/2019 | Desai et al. |
| 2019/0171886 A1 | 6/2019 | Ashour et al. |
| 2019/0236489 A1 | 8/2019 | Koudal et al. |
| 2019/0286942 A1 | 9/2019 | Abhiram et al. |
| 2019/0325299 A1 | 10/2019 | Oliveira Pinheiro |
| 2019/0333633 A1 | 10/2019 | Sugaya |
| 2019/0362243 A1 | 11/2019 | Matsumura |
| 2020/0019780 A1 | 1/2020 | Sugaya |
| 2020/0058001 A1* | 2/2020 | Naritake ............ G06Q 10/0875 |
| 2021/0089824 A1 | 3/2021 | Ge et al. |
| 2021/0365685 A1 | 11/2021 | Shah et al. |

FOREIGN PATENT DOCUMENTS

| | | |
|---|---|---|
| CN | 106920071 A | 7/2017 |
| EP | 2775408 A1 | 9/2014 |
| JP | 2006309486 A | 11/2006 |
| JP | 2010003190 A | 1/2010 |
| JP | 2011090348 A | 5/2011 |
| JP | 2011170690 A | 9/2011 |
| JP | 2014085730 A | 5/2014 |
| JP | 2014238680 A | 12/2014 |
| JP | 2017224133 A | 12/2017 |
| JP | 6267841 B1 | 1/2018 |
| JP | 2018049421 A | 3/2018 |
| JP | 6321879 B1 | 5/2018 |
| JP | 2018092227 A | 6/2018 |
| JP | 2018097437 A | 6/2018 |
| JP | 2018097580 A | 6/2018 |
| JP | 2018101353 A | 6/2018 |
| JP | 2018194949 A | 12/2018 |
| JP | 2018206085 A | 12/2018 |
| JP | 2018206341 A | 12/2018 |
| JP | 2019021150 A | 2/2019 |
| JP | 2019032593 A | 2/2019 |
| JP | 2019109844 A | 7/2019 |
| JP | 6651190 B1 | 2/2020 |
| WO | 2011105671 A1 | 9/2011 |
| WO | 2017169907 A1 | 10/2017 |
| WO | 2017216929 A1 | 12/2017 |
| WO | 2018100878 A1 | 6/2018 |

OTHER PUBLICATIONS

Related U.S. Appl. No. 16/765,139; First Named Inventor: Satoshi Kuroda; Title: "Information Providing System and Information Providing Method"; filed May 18, 2020.
International Search Report (ISR) and Written Opinion dated Aug. 13, 2019 issued in International Application No. PCT/JP2019/028626.
Related U.S. Appl. No. 16/972,273; First Named Inventor: Satoshi Kuroda; Title: "Information Providing System"; filed Dec. 4, 2020.
Related U.S. Appl. No. 17/029,980; First Named Inventor: Satoshi Kuroda; Title: "Information Providing System"; filed Sep. 23, 2020.
Related U.S. Appl. No. 16/962,055; First Named Inventor: Satoshi Kuroda; Title: "Learning Method and Information Providing System"; filed Jul. 14, 2020.
Related U.S. Appl. No. 16/962,085; First Named Inventor: Satoshi Kuroda; Title: "Information Providing System"; filed Jul. 14, 2020.
Related U.S. Appl. No. 16/962,113; First Named Inventor: Satoshi Kuroda; Title: "Learning Method and Information Providing System"; filed Jul. 14, 2020.
International Search Report (ISR) and Written Opinion dated Apr. 28, 2020 issued in International Application No. PCT/JP2020/013358.
International Search Report (ISR) and Written Opinion dated Apr. 7, 2020 issued in International Application No. PCT/JP2020/005544.
International Search Report (ISR) and Written Opinion dated Apr. 7, 2020 issued in International Application No. PCT/JP2020/005545.
International Search Report (ISR) and Written Opinion dated Jun. 16, 2020 issued in International Application No. PCT/JP2020/013352.
International Search Report (ISR) and Written Opinion dated Jun. 16, 2020 issued in International Application No. PCT/JP2020/013357.
International Search Report (ISR) and Written Opinion dated May 18, 2021 issued in International Application No. PCT/JP2021/010015.
International Search Report (ISR) and Written Opinion dated Oct. 27, 2020 issued in International Application No. PCT/JP2020/029033.
U.S. Appl. No. 17/417,987, First Named Inventor: Satoshi Kuroda; Title: "Information Processing Device and Information Processing Method"; filed Jun. 24, 2021.
Chinese Office Action (and English language translation thereof) dated Jun. 21, 2021, issued in counterpart Chinese Application No. 201980003667.8.
Office Action (Non-Final Rejection) dated Mar. 2, 2022 issued in related U.S. Appl. No. 16/962,085.
An Office Action (Non-Final Rejection) dated Apr. 13, 2021, issued in related U.S. Appl. No. 16/765,139.
An Office Action (Non-Final Rejection) dated Mar. 28, 2022, issued in related U.S. Appl. No. 17/029,980.

(56) References Cited

OTHER PUBLICATIONS

An Office Action (Non-Final Rejection) dated Mar. 31, 2022, issued in related U.S. Appl. No. 16/765,130.
Office Action (Non-Final Rejection) dated Apr. 13,20212, issued in related U.S. Appl. No. 16/765,139.
Office Action (Non-Final Rejection) dated Mar. 28, 2022, issued in related U.S. Appl. No. 17/029,980.
Office Action (Non-Final Rejection) dated Mar. 31, 2022, issued in related U.S. Appl. No. 16/765,130.
LU., et al., "Exploratory Product Image Search With Circle-to-Search Interaction", in IEEE Transactions on Circuits and Systems for Video Technology, vol. 25, No. 7, pp. 1190-1202, Jul. 2015, doi: 10.1109/TCSVT .2014.2372272. (Year: 2015).

\* cited by examiner

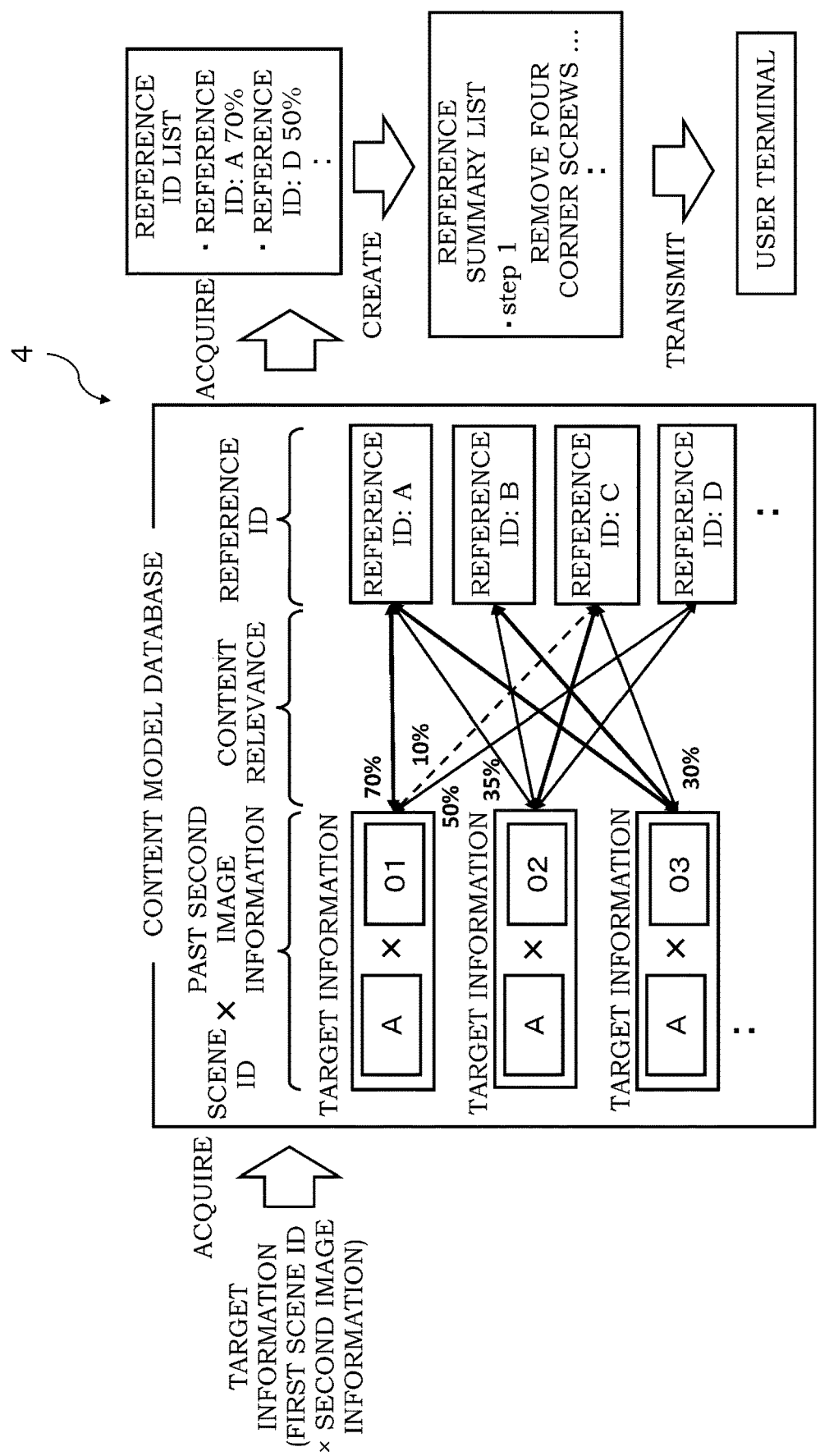

FIG. 5A

SCENE MODEL TABLE

| SCENE ID | LEARNING MODEL |
|---|---|
| 0FE | ... |
| 0FD | ... |
| : | : |

FIG. 5B

SCENE CONTENT MODEL TABLE (for 0FE)

| CONTENT ID | LEARNING MODEL |
|---|---|
| 1B827-02 | ... |
| [NULL] | ... |
| : | : |

FIG. 6A

SCENE TABLE

| SCENE ID | SCENE NAME |
|---|---|
| 0FD | REACTIVATION OF ABC-999 DEVICE |
| 0FE | REMOVE MEMORY OF ABC-999 DEVICE |
| .. | .. |

FIG. 6B

CONTENT TABLE

| SCENE ID | CONTENT ID | CONTENTS | SUMMARY | HASH VALUE |
|---|---|---|---|---|
| 0FE | 1B827-02 | 1B827-02/1.pdf | step 1 REMOVE FOUR CORNER SCREWS, AND WHILE WITH BOTH HANDS, STRONGLY ... | 564544d8f0b746e |
| 0FE | 1B828-02 | 1B828-02/2.pdf | step 2 LIFT TOP BOARD HORIZONTALLY ... | 4d8f0b746e56454 |
| [NULL] | 38D92-01 | 38D92-01/info.mov | [VIDEO] 3:08 | ef984e9e1e20e16 |
| .. | .. | .. | .. | .. |

FIG. 7A

NAME CACHE TABLE

| SCENE ID | SCENE NAME |
|---|---|
| 0FD | REACTIVATION OF ABC-999 DEVICE |
| 0FE | REMOVE MEMORY OF ABC-999 DEVICE |
| .. | .. |

FIG. 7B

SUMMARY CACHE TABLE

| CONTENT ID | SUMMARY |
|---|---|
| 1B827-02 | step 1 REMOVE FOUR CORNER SCREWS, AND WHILE WITH BOTH HANDS, STRONGLY ... |
| 1B828-02 | step 2 LIFT TOP BOARD HORIZONTALLY ... |
| 38D92-01 | [VIDEO] 3:08 |
| .. | .. |

FIG. 8A

META-TABLE

| REFERENCE ID | CONTENT ID | META-ID |
|---|---|---|
| A | 1B827-02 | 24FD |
|   | 1B828-02 | 83D9 |
|   | .. | .. |
|   | .. | .. |
| B | .. | .. |

FIG. 8B

META-CATEGORY MASTER TABLE

| CATEGORY ID | CATEGORY NAME |
|---|---|
| 025 | COLOR |
| 394 | WEIGHT |
| .. | .. |

FIG. 8C

META-MASTER TABLE

| CATEGORY ID | META-ID | META-VALUE |
|---|---|---|
| 394 | 24FD | LIGHT WEIGHT |
| 025 | 83D9 | WHITE |
| .. | .. | .. |

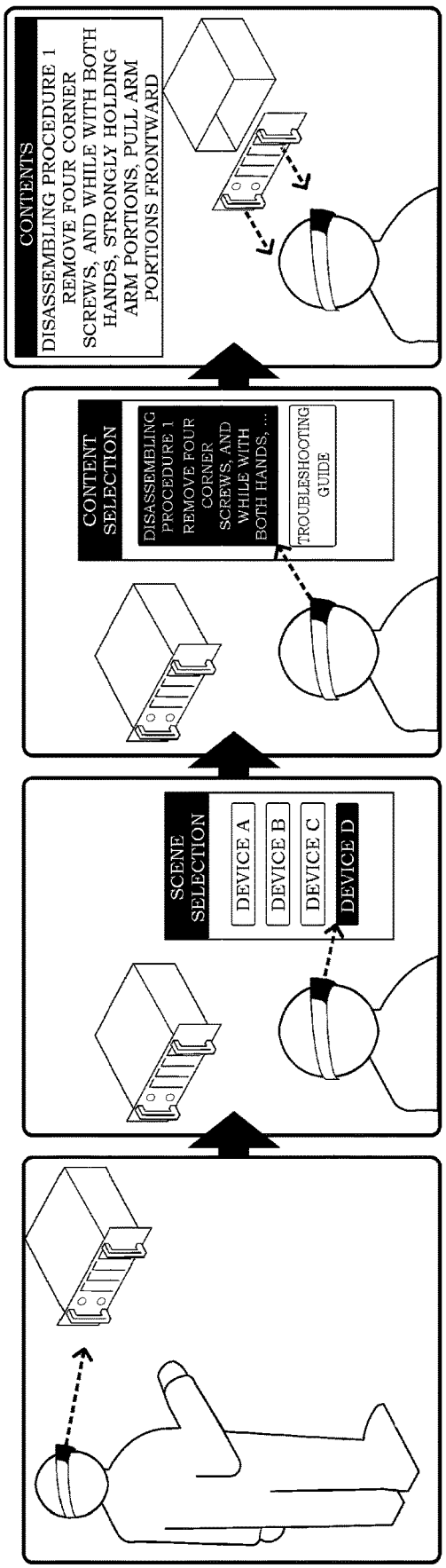

INFORMATION SERVICE SYSTEM AND INFORMATION SERVICE METHOD

TECHNICAL FIELD

The present invention relates to an information service system and an information service method for narrowing a plurality of contents for output to a user terminal on the basis of image information acquired from the user terminal.

BACKGROUND ART

In recent years, as image recognition technologies and technologies such as virtual reality (VR), augmented reality (AR), and mixed reality (MR) are developed, a method of allowing a user to reference various types of information in an overlapping manner using a display unit called a head-mounted display (HMD) mounted on the user's head has been disclosed. For example, a wearable terminal display system has been proposed in Patent Literature 1, in which a predicted harvest time of agricultural crops viewed through a display panel is displayed on the display panel of the wearable terminal as augmented reality.

In the wearable terminal display system of Patent Literature 1, an image of agricultural crops within a view range of the wearable terminal is photographed using a camera, and the image is analyzed to specify a type of the agricultural crops. In addition, a determination criterion suitable for the type of the agricultural crops is selected, and a color and a size are determined by analyzing the image on the basis of the determination criterion. Then, a harvest time of the agricultural crops is predicted, and the predicted harvest time is displayed on a display panel of the wearable terminal as augmented reality.

For example, Patent Literature 2 proposes a work assistance system, in which a work target is determined on the basis of a rule of a work manual or the like, and work assistance information is displayed on a display panel of the operator's wearable terminal as augmented reality.

In the work assistance system of Patent Literature 2, a rule describing a determination condition for a work target or a work status is created by associating elements of the manual regarding work procedures, contents, cautions, or other matters, and the rule is subjected to optimization and learning such that an exemplary model has a best evaluation result. Then, a work target and a work status are recognized on the basis of sensor information acquired from sensors, and the work assistance information is output on the basis of the created rule and the recognition result of the recognition means.

CITATION LIST

Patent Literature

Patent Literature 1: Japanese Patent No. 6267841
Patent Literature 2: Japanese Patent No. 6321879

SUMMARY OF INVENTION

Problem to be Solved by the Invention

Here, for example, in a case where an abnormality occurs in equipment installed in a user's site or the like during a work such as a maintenance or repair work for equipment or the like used in the field (workplace), it is necessary to stop the device until a countermeasure starting from occurrence of the abnormality. This may affect an operation or service provided in the user's site or the like.

For example, equipment installed in a production line in a factory or the like is built by assembling a plurality of devices or modules that are installed in a production line in different times. For this reason, it is necessary to specify an abnormal part by checking the operation status of surrounding equipment, configurations of the parts, or the like.

For example, in the case of equipment such as an escalator or an elevator installed in a station or a commercial facility, equipment of an outdoor parking lot, or the like, the equipment structure is complicated, and the parts may be replaced after installation, so that configurations or part numbers of the replaced parts may change in some cases. Furthermore, such a problem may be recognized first by disassembling the equipment, or may be different from those described in a maintenance manual in some cases. For this reason, it is necessary to check replacement procedures for relating parts, alternative parts, or the like in addition to the information described in the manual of the equipment.

However, in the actual field, the number of highly experienced experts or technicians for such a work is decreasing year by year. Therefore, in the future, it is expected that young engineers who are relatively inexperienced, foreign engineers who came to Japan from overseas and are trained for equipment maintenance or repair, or the like will be employed in order to train human resources as well.

In this regard, in the technique disclosed in Patent Literature 1, a prediction result is displayed on the basis of determination for appearance, shapes or the like of agricultural crops. For this reason, it is difficult to provide the information by sequentially narrowing the information depending on various field environments, installation situations, equipment configurations, or the like.

In the technique disclosed in Patent Literature 2, work assistance is only performed by creating a learning model based on a rule of the manual. For this reason, if the field situation or the equipment configuration is changed in practice, so that the content or procedure is different from those described in the manual used in the learning, it is difficult to flexibly cope with or determine a problem in the field. In order to cope with a new problem, a learning model is created every time, which takes time and cost. For this reason, it is difficult to efficiently provide information suitable for an actual field or work or efficiently update target information.

In view of the aforementioned problems, an object of the invention is to provide an information service system capable of narrowing states depending on a field situation and providing an optimum information asset by directly utilizing existing information assets.

Means for Solving the Problem

According to a first invention, there is provided an information service system for narrowing a plurality of contents for output to a user terminal on the basis of image information acquired from the user terminal, the information service system including: a first acquiring means configured to acquire first image information from the user terminal; a scene model database configured to store past first image information acquired in advance, scene information containing a scene ID associated with the past first image information, and a scene relevance having three or more levels between the past first image information and the scene information; a first evaluation means configured to acquire a scene ID list including a first scene relevance between the first image information and the scene information by referencing the scene model database; a first creating means configured to create a scene name list corresponding to the scene ID list; a second acquiring means configured to acquire target information from the user terminal, the target information containing a set of second image information and a first scene ID corresponding to a scene name selected from the scene name list; a content model database configured to store past target information containing a set of past second image information acquired in advance and a scene ID, a reference ID that is associated with the past target information and corresponds to the content, and a content relevance having three or more levels between the past target information and the reference ID; a second evaluation means configured to acquire a reference ID list including a first content relevance between the target information and the reference ID by referencing the content model database; a second creating means configured to create a reference summary list corresponding to the reference ID list; a third acquiring means configured to acquire a first reference ID selected from the reference summary list via the user terminal; and an output means configured to output the content corresponding to the acquired first reference ID.

According to a second invention, the information service system described above may further include a scene ID creating unit, the scene ID creating unit having a scene name acquiring means configured to acquire the past first image information acquired in advance and a scene name corresponding to the past first image information, a scene ID creating means configured to create the scene ID having an information amount smaller than that of the scene name for each of the acquired scene names, and a first learning means configured to create the scene model database through machine learning using the scene information and the past first image information.

According to a third invention, the information service system in the first and second inventions may further include a content ID creating unit, the content ID creating unit having a content acquiring means configured to acquire the past second image information acquired in advance and the content corresponding to the past second image information, a content ID creating means configured to create a content ID having an information amount smaller than that of the content for each of the acquired contents, and a second learning means configured to create the content model database through machine learning using reference information and the past target information.

According to a fourth invention, in the information service system in the third invention, the content ID may be associated with a plurality of pieces of meta-information.

According to a fifth invention, in the information service system in any of the first to fourth inventions, the user terminal may further include a receiving means configured to receive the scene ID list acquired by the first evaluation means, a determination means configured to determine whether or not a scene ID included in the received scene ID list exists in a cache region of the user terminal depending on a result of receipt of the scene ID list, and a query means configured to query a content information database having the content if the scene ID included in the received scene ID list does not exist in the cache region of the user terminal depending on a result of the determination.

According to a sixth invention, in the information service system in any of the first to fifth inventions, the user terminal may further include a receiving means configured to receive the reference ID list acquired by the second acquiring means, a determination means configured to determine whether or not a reference ID included in the received reference ID list exists in the cache region of the user terminal depending on a result of receipt of the reference ID list, and a query means configured to query a content information database having the contents if the reference ID included in the received reference ID list does not exist in the cache region of the user terminal depending on a result of the determination.

According to a seventh invention, in the information service system in any of the first to sixth inventions, the user terminal may include a display unit mounted on a head or eyeglasses to display information created on the basis of the first image information acquired from the user terminal in a transparent state.

According to an eighth invention, in the information service system in any of the first to seventh inventions, the content may include at least information regarding any of a part or all of text, illustration, video, or sound.

According to a ninth invention, there is provided an information service method for narrowing a plurality of contents for output to a user terminal on the basis of image information acquired from the user terminal, the information service method including: a first process for acquiring first image information from the user terminal; a second process for storing, in a scene model database, past first image information acquired in advance, scene information containing a scene ID associated with the past first image information, and a scene relevance having three or more levels between the past first image information and the scene information; a third process for acquiring a scene ID list including a scene relevance between the first image information and the scene ID by referencing the scene model database; a fourth process for creating a scene name list corresponding to the scene ID list; a fifth process for acquiring target information containing a set of second image information and a first scene ID corresponding to a scene name selected from the scene name list from the user terminal; a sixth process for storing, in a content model database, the past target information containing a set of past second image information acquired in advance and a scene ID, a reference ID that is associated with the target information and corresponds to the content, and a content relevance having three or more levels between the past target information and the reference ID; a seventh process for acquiring a reference ID list including a first content relevance between the target information and the reference ID by referencing the content model database; an eighth process for creating a reference summary list corresponding to the reference ID list; a ninth process for acquiring a first reference ID selected from the reference summary list via the user terminal; and a tenth process for outputting the content corresponding to the acquired first reference ID.

Advantageous Effects of Invention

According to the first invention, the first evaluation means and the first creating means are provided. For this reason, it is possible to acquire the scene ID list by referencing the scene model database on the basis of the acquired first image information, and create the scene name list corresponding to the scene ID list. In addition, the second evaluation means and the second creating means are provided. For this reason, it is possible to acquire the reference ID list by referencing the content model database on the basis of the acquired target information and create a reference summary list. As a result, it is possible to suitably perform narrowing of the scene and the content to be output depending on a field situation, a progress of the operator's work, or a condition of the equipment.

According to the first invention, the scene model database is provided. For this reason, it is possible to acquire the scene ID list on the basis of a scene relevance between the past first image information acquired in advance and the scene information. In addition, the content model database is provided. For this reason, it is possible to acquire the reference ID list on the basis of the content relevance between the past target information acquired in advance and the reference ID. Furthermore, the scene model database and the content model database are managed using a common ID. For this reason, when one of the databases (scene model database) is updated, it is not necessary to update the other database (content model database). For this reason, it is possible to remarkably reduce a creating time or an updating time for the machine learning. Moreover, it is possible to perform the narrowing depending on a field situation, and directly utilize the existing information assets. Therefore, it is possible to provide one of the existing information assets optimum to the field.

According to the first invention, the second acquiring means, the third acquiring means, and the output means are provided. For this reason, it is possible to transmit the created reference summary list to the user terminal, acquire the reference ID selected using the user terminal, and output the corresponding content on the basis of the acquired reference ID. As a result, it is possible to efficiently acquire and provide suitable information.

According to the second invention, the scene ID creating unit is provided. The scene ID creating unit has the scene name acquiring means, the scene ID creating means, and the first learning means. For this reason, the scene ID having an information amount smaller than that of the scene name is created for each of the acquired scene name. As a result, it is possible to save a communication load for exchange and enable a fast response. Furthermore, since only the target ID may be corrected when one of the databases is updated, it is not necessary to update the other database.

According to the third invention, the content ID creating unit is provided. The content ID creating unit has the content acquiring means, the content ID creating means, and the second learning means. For this reason, the second content ID having an information amount smaller than that of the content information is created from the acquired content information. As a result, it is possible to save a communication load for the exchange and enable a fast response. In addition, only the target ID may be corrected when one of the databases is updated. Therefore, it is not necessary to update the other database.

According to the fourth invention, the content information contains meta-information. For this reason, it is possible to allocate a more specific attribute to the content information. As a result, it is possible to accurately allocate or provide the content and efficiently acquire and provide suitable information.

According to the fifth invention, the user terminal has the receiving means, the determination means, and the query means. For this reason, it is possible to determine whether or not the scene ID included in the received scene ID list exists in the cache region. For this reason, the scene ID is received from the other scene model database only when the corresponding scene ID does not exist in the host terminal. As a result, it is possible to narrow the state depending on a situation of the field and efficiently acquire and provide suitable information.

According to the sixth invention, the user terminal has the receiving means, the determination means, and the query means. For this reason, it is possible to determine whether or not the content ID scene ID included in the received content ID exists in the cache region. For this reason, the content ID scene ID is received from the other scene model database only when the corresponding scene ID does not exist in the host terminal. As a result, it is possible to narrow the state depending on a situation of the field and efficiently acquire and provide suitable information.

According to the seventh invention, the user terminal has the display unit mounted on a head or eyeglasses to display information created on the basis of the first image information acquired from the user terminal in a transparent state. For this reason, it is possible to achieve a hand-free manipulation in the field. As a result, it is possible to efficiently acquire and provide suitable information by freely using the user terminal.

According to the eighth invention, the reference information includes at least information regarding all or a part of text, illustration, video, or sound. For this reason, it is possible to provide various contents. As a result, it is possible to efficiently acquire and provide suitable information.

BRIEF DESCRIPTION OF DRAWINGS

FIG. 3 is a schematic diagram illustrating an exemplary content model database according to one embodiment of the invention;

FIG. 5A is a schematic diagram illustrating an exemplary configuration of a scene model table according to one embodiment of the invention;

FIG. 5B is a schematic diagram illustrating an exemplary configuration of a scene content model table (for 0FE);

FIG. 6A is a schematic diagram illustrating an exemplary scene table according to one embodiment of the invention;

FIG. 6B is a schematic diagram illustrating an exemplary content table according to one embodiment of the invention;

FIG. 7A is a schematic diagram illustrating an exemplary configuration of a name cache table according to one embodiment of the invention;

FIG. 7B is a schematic diagram illustrating an exemplary configuration of a summary cache table according to one embodiment of the invention;

FIG. 8A is a schematic diagram illustrating an exemplary configuration of a meta-table according to one embodiment of the invention;

FIG. 8B is a schematic diagram illustrating an exemplary configuration of a meta-category master table according to one embodiment of the invention;

FIG. 8C is a schematic diagram illustrating an exemplary configuration of a meta-master table according to one embodiment of the invention;

FIG. 12A is a schematic diagram illustrating an exemplary first acquiring means according to one embodiment of the invention;

FIG. 12B is a schematic diagram illustrating an exemplary second acquiring means according to one embodiment of the invention;

FIG. 12C is a schematic diagram illustrating an exemplary third acquiring means according to one embodiment of the invention; and FIG. 12D is a schematic diagram illustrating an exemplary output means according to one embodiment of the invention.

DESCRIPTION OF EMBODIMENTS

Examples of an information service system and an information service method according to one embodiment of the invention will now be described with reference to the accompanying drawings.

Figure 1:
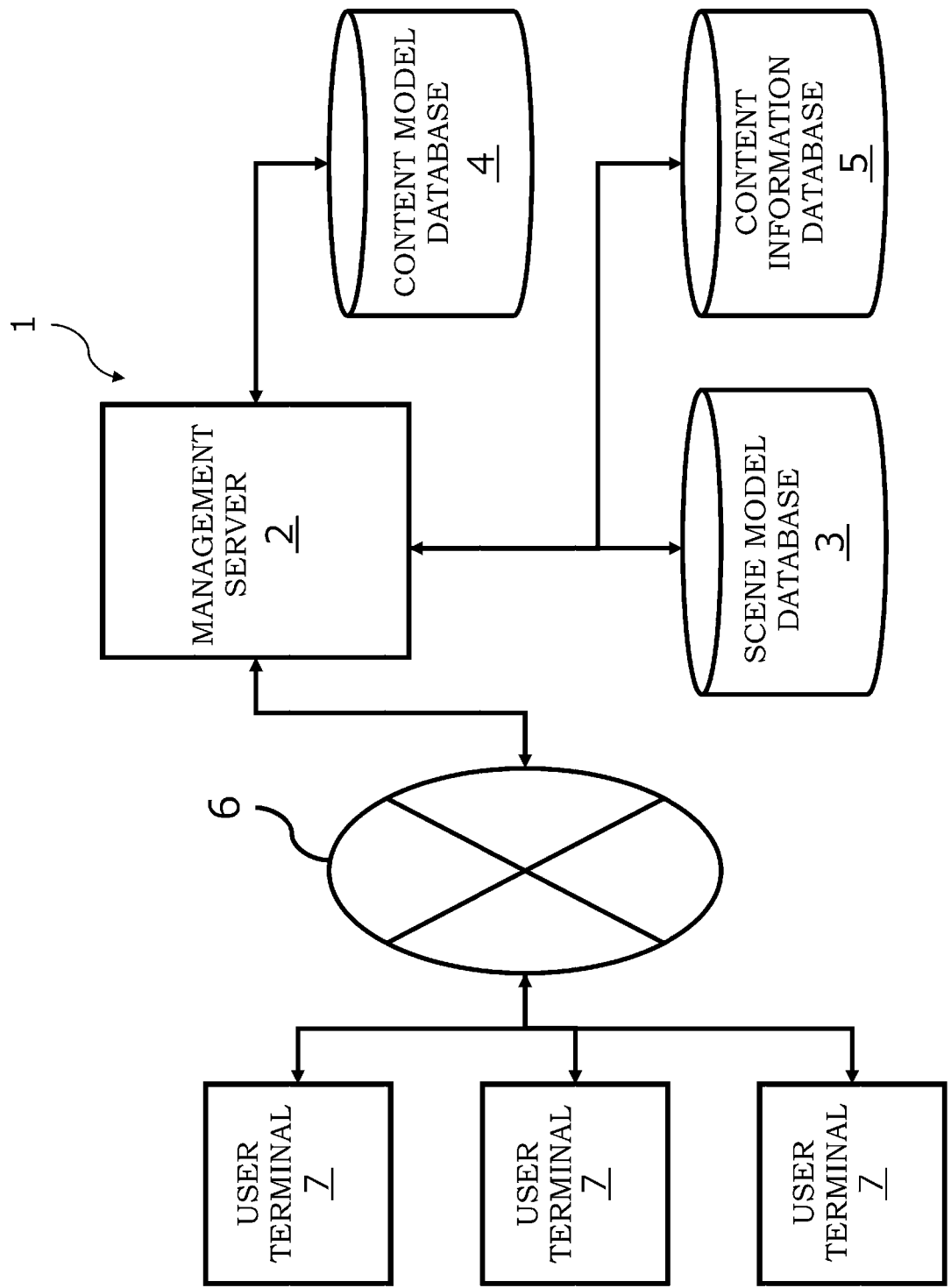
FIG. 1 is a block diagram illustrating an exemplary configuration of an information service system according to one embodiment of the invention.

FIG. 1 is a schematic diagram illustrating an exemplary information service system 1 according to one embodiment of the invention.

First Embodiment

An exemplary configuration of the information service system 1 according to a first embodiment will be described with reference to FIGS. 1 to 12. FIG. 1 is a block diagram illustrating a whole configuration of the information service system 1 according to this embodiment.

As illustrated in FIG. 1, the information service system 1 includes a management server 2, a scene model database 3, a content model database 4, and a content information database 5. The management server 2 is, for example, connected to a user terminal 7 possessed by an operator of a field (site) via a public communication network 6.

The management server 2 is used to perform works such as maintenance or repair for equipment or the like provided in the field. The management server 2 acquires image information regarding equipment or the like acquired from the user terminal 7 in the field. The management server 2, for example, acquires various data, evaluates the data, and outputs information by referencing the scene model database 3 and the content model database 4.

The scene model database 3 stores past first image information acquired in advance, scene information containing a scene ID associated with the past first image information, and a scene relevance having three or more levels between the past first image information and the scene information. The content model database 4 stores past target information containing a set of past second image information acquired in advance and the scene ID, a reference ID that is associated with the past target information and corresponds to the content, and a content relevance having three or more levels between the past target information and the reference ID.

For example, a result obtained on the basis of the target information and the reference ID (content ID) is stored in the content model database. The content information database 5 records, for example, the contents. The contents may include, for example, a product introduction video, a solution manual video, or the like in addition to materials relating to documents such as an equipment manual, an instruction manual, a catalog, a paper, or a report. The content is registered, for example, by an administrator of the content, or the like. The content to be registered may include, for example, a sound file or the like or a file containing translated voice of a foreign language or the like corresponding to Japanese. For example, when a voice language of a certain country is registered, a translated voice file of a corresponding foreign language may be stored. Registration or updating of such a content may be performed via a public communication network 6 (network) as a manager of each manufacturer or a person in charge of manual preparation manipulates the terminal. In addition, the registration or updating of such contents may be collectively performed, for example, by an agent who acts for management or the like performed by a manager or a person in charge of manual preparation.

The public communication network 6 includes the Internet network or the like in which the information service system 1, the management server 2, or the like are connected via a communication circuit. The public communication network 6 may include a so-called optical fiber communication network. In addition, the public communication network 6 may include a radio communication network without limiting to a wired communication network.

<User Terminal 7>

The user terminal 7 has a display unit integrally or partially mounted on a head or eyeglasses to display information created from the first image information acquired from the user terminal 7 in a transparent state. The user terminal 7 may be, for example, a HoloLens (registered trademark) which is a type of a head-mounted display (HMD). An operator can recognize a work area or evaluation target equipment in a transparent manner using a transparent type display unit such as a head-mounted display or a HoloLens that displays presentation information of the user terminal 7. As a result, an operator can recognize, in combination, a scene name list, a reference summary list, and contents created from the acquired first image information while watching a situation in front of the eyes.

The user terminal 7 has a receiving means that receives a scene ID list acquired by a first evaluation means or a reference ID list acquired by a second acquiring means, a determination means that checks whether or not a target ID exists in a cache region of the user terminal 7, and a query means that queries a corresponding content information database 5 if the target ID does not exist in the cache region of the user terminal 7.

<Scene Model Database 3>

Figure 2:
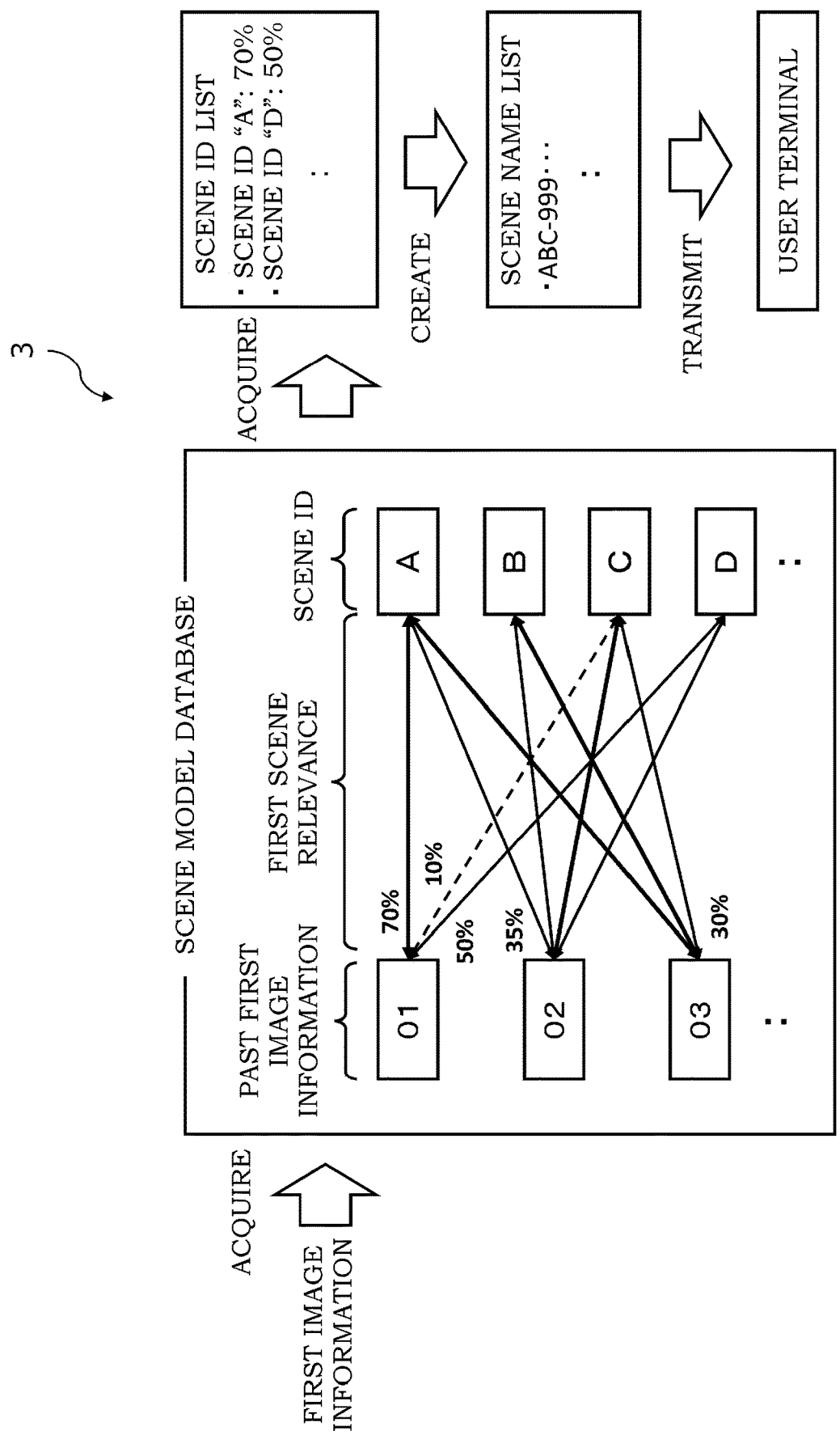
FIG. 2 is a schematic diagram illustrating an exemplary scene model database according to one embodiment of the invention.

FIG. 2 is a schematic diagram illustrating an exemplary scene model database 3 according to this embodiment. The scene model database 3 stores past first image information acquired in advance, scene information containing scene IDs associated with the past first image information, and a scene relevance having three or more levels between the past first image information and the scene information. The first image information is, for example, an image photographed by a camera or the like of the user terminal 7 possessed by an operator in the field. The first image information may include, for example, either a still image or a video, may be photographed by an operator, or may be automatically photographed depending on a setting of the user terminal 7. Alternatively, the first image information may be read into the image information recorded in a memory or the like of the user terminal 7 or may be acquired via a public communication network 6.

The scene model database 3 is built on the basis of evaluation results of the first image information acquired through machine learning, the past first image information, and the scene ID, and stores, for example, respective relationships as a scene relevance. For example, the scene model database 3 stores the relationship such that the past first image information "01" has a relevance of 70% with the scene ID "A", a relevance of 50% with the scene ID "D", and a relevance of 10% with the scene ID "C", and the like. The first image information acquired from the user terminal 7 is subjected to machine learning to build an evaluation result such as similarity to the past first image information acquired in advance. For example, it is possible to cope with non-identical but similar information through deep learning.

The scene model database 3 stores the past first image information acquired in advance, scene information containing scene IDs associated with the past first image information, and a first scene relevance having three or more levels to indicate a matching degree between the past first image information and the scene information. A first evaluation means selects the past first image information that matches, partially matches, or is similar to the past first image information by referencing the scene model database 3, and selects scene information containing the scene ID associated with the selected past first image information. In addition, the first evaluation means calculates a first scene relevance on the basis of the relevance between the selected past first image information and the selected scene information and acquires the scene ID including the calculated first scene relevance. The scene name list selected on the basis of the scene ID list is displayed on the user terminal 7.

The scene model database 3 stores the scene ID list. The scene ID list is acquired by a first evaluation means 202 described below. The scene name list is a list in which pairs of the past first image information and the scene ID are evaluated on the basis of the scene relevance calculated, for example, through machine learning. The scene model database 3 stores the listed content which is the evaluation result. The listed content includes, for example, scene IDs having a high relationship of the scene relevance, such as "scene ID A: 70%" or "scene ID D: 50%".

The scene model database 3 stores the scene ID list and the scene name list. The scene name list is created by a first creating means 203 described below. For example, a scene name corresponding to the scene ID is acquired by the first evaluation means 202, and a list of the scene names is stored in the scene ID list. The scene name list stored in the scene model database 3 is transmitted to the user terminal 7 in the subsequent process. A user recognizes a scene corresponding to the first image information by referencing the scene name list received by the user terminal 7.

Note that, in a case where scene information corresponding to the first image information and a scene name corresponding to the scene ID do not exist in the scene model database 3 due to updating of the scene model database, correction or addition of the registered data, or the like, for example, a processing of acquiring the first image information is performed for a different view range. Alternatively, a scene name list may be created by adding a scene name "the corresponding scene does not exist" and may be transmitted to the user terminal 7.

<Content Model Database 4>

FIG. 3 is a schematic diagram illustrating an exemplary content model database 4 according to this embodiment. The content model database 4 stores past target information containing a set of past second image information acquired in advance and a scene ID, a reference ID that is associated with the past target information and corresponds to the content, and a content relevance having three or more levels between the past target information and the reference ID. The image information stored in the content model database 4 is photographed by the user terminal 7. The first acquiring means 201 acquires second image information photographed as image information, which is the image information of the field. This second image information is, for example, an image photographed using a camera or the like of the user terminal 7 possessed by an operator in the field. Similar to the first image information described above, the second image information may include, for example, either a still image or a video, may be photographed by an operator, or may be automatically photographed depending on a setting of the user terminal 7. Alternatively, the second image information may be read into the image information recorded in a memory or the like of the user terminal 7 or may be acquired via a public communication network 6.

The content model database 4 stores the first scene ID from the user terminal 7 along with the acquired second image information. The first scene ID is a scene ID belonging to the scene name list stored in the scene model database 3 and corresponding to the scene name selected by a user. The content model database 4 stores the first scene ID and the second image information as target information. Note that, in a case where the aforementioned processing is repeated, it is repeated until this process. Note that a plurality of first scene IDs may exist. In this case, a plurality of scene names is selected from the scene name list by the user.

The content model database 4 stores past target information containing a set of past second image information acquired in advance and a scene ID, a reference ID that is associated with the past target information and corresponds to the contents, and a content relevance having three or more levels to indicate a matching degree between the past target information and the reference ID. A second evaluation means selects the past second image information, the past second image information that matches, partially matches, or is similar to the target information, and the scene ID by referencing the content model database 4, and selects a reference ID associated with the selected past second image information and the target information. In addition, the second evaluation means calculates a second relevance on the basis of a relevance between the selected past second image information and the target information, and acquires a reference ID including the calculated second scene relevance. Furthermore, the reference summary list selected on the basis of the reference ID list is displayed on the user terminal 7.

An evaluation result for the target information and the reference ID having high similarity is expressed such that, for example, target information "A×01" has a relevance of 70% with the "reference ID: A", a relevance of 50% with the "reference ID: D", or a relevance of 10% with the "reference ID: C". The target information acquired by the second acquiring means is evaluated, for example, regarding similarity to the target information or the like. This processing may also be performed through an artificial intelligence (AI) image processing or the like (not shown). By employing the AI image processing, it is possible to perform a special processing within a short time, compared to the processing of the prior art.

Then, the content model database 4 stores the reference ID list. The reference ID list is acquired by the second evaluation means. For example, using the content relevance built through machine learning, a pair of the target information and the reference information associated with the past second image information and the reference ID is evaluated. On the basis of a result of this evaluation, reference IDs having high relevance in the evaluation result are listed. The listed reference IDs are built to include, for example, reference IDs having a high relationship of the content relevance, such as "reference ID: A 70%" or "reference ID: D 50%", and are stored in the content model database 4.

Then, the content model database 4 stores the reference ID list acquired by the second evaluation means and the reference summary list created by the second creating means. The reference summary list is recorded in a content table described below on the basis of the reference ID determined using the reference ID list. A second acquiring means 204 acquires "summary" to be registered in the content table stored in the content model database 4. A second evaluation means 205 acquires the reference ID list including the first content relevance with the reference ID. The second creating means 206 creates a reference summary list on the basis of the acquired summary information. The reference summary list created by the second creating means 206 is transmitted to the user terminal 7.

Note that, in a case where a reference ID and data such as contents and the summary corresponding to the scene ID do not exist in the content model database 4 due to updating of the content model database 4, correction or addition of the registered data, or the like, for example, a scene ID reserved as an alternative for the case of no matching may be newly associated, and the associated alternative content may be transmitted to the user terminal 7.

<Management Server 2>

Figure 4A:
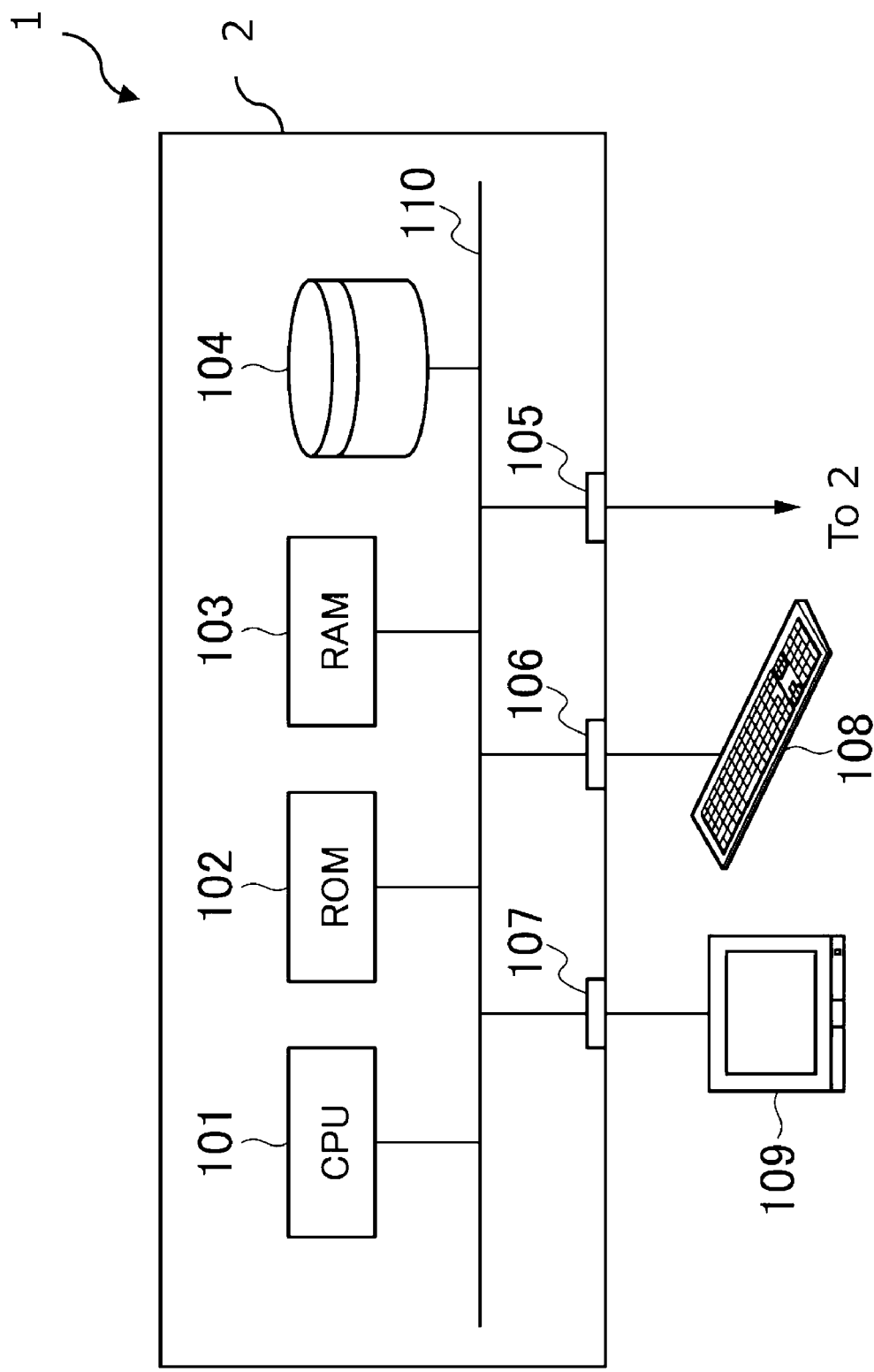
FIG. 4A is a schematic diagram illustrating an exemplary configuration of a user equipment of the information service system according to one embodiment of the invention.

FIG. 4A is a schematic diagram illustrating the management server 2 of the information service system 1. As the management server 2, the management server 2 includes a casing 10, a central processing unit (CPU) 101, a read only memory (ROM) 102, a random access memory (RAM) 103, a storage unit 104, and interfaces (I/Fs) 105 to 107. Each element 101 to 107 is connected to each other via an internal bus 110.

The CPU 101 controls the entire management server 2. The ROM 102 stores operation codes of the CPU 101. The RAM 103 is a work area used in operation of the CPU 101. Various types of information such as measurement information are stored in the storage unit 104. The storage unit 104 may include, for example, a hard disk drive (HDD), a solid state drive (SSD), or the like.

The I/F 105 is an interface for transmitting/receiving various types of information to/from the user terminal 7 or the like via the public communication network 6. The I/F 106 is an interface for transmitting/receiving information to/from an input part 108. The input part 108 includes, for example, a keyboard. A manager or operator who uses the information service system 1, a contents manager, or the like inputs or selects various types of information, a control command of the management server 2, or the like using the input part 108. The I/F 107 is an interface for transmitting/receiving various types of information to/from the output part 109. The output part 109 outputs various types of information stored in the storage unit 104, a processing status of the management server 2, or the like. The output part 109 may include a display such as a touch panel. In this case, the output part 109 may also include the input part 108.

Figure 4B:
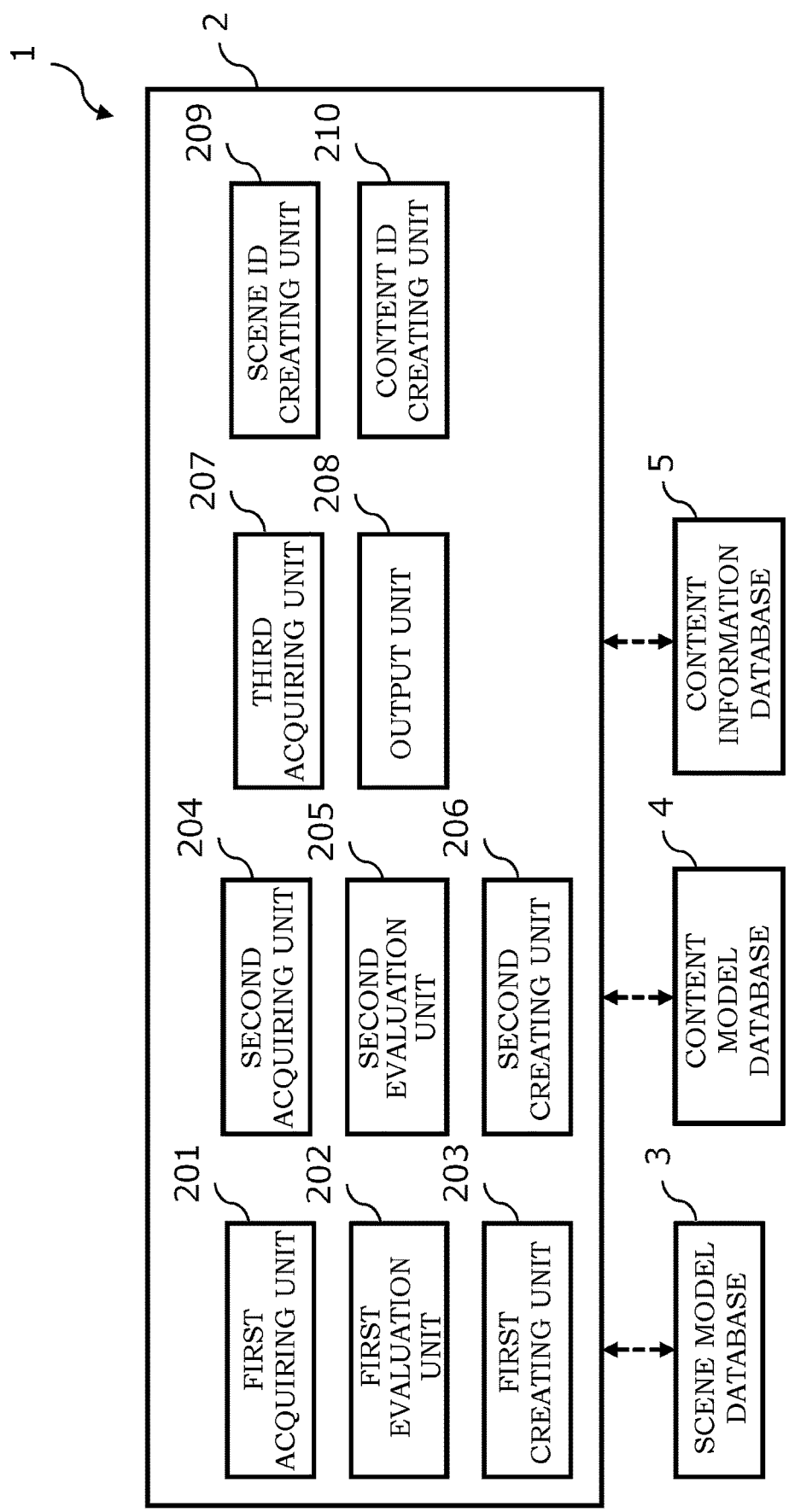
FIG. 4B is a schematic diagram illustrating an exemplary function of a management server of the information service system according to one embodiment of the invention.

FIG. 4B is a schematic diagram illustrating an exemplary function of the management server 2. The management server 2 includes a first acquiring means 201, a first evaluation means 202, a first creating means 203, a second acquiring means 204, a second evaluation means 205, a second creating means 206, a third acquiring means 207, an output means 208, a scene ID creating unit 209 having a scene name acquiring means, a scene ID creating means, and a first learning means, and a content ID creating unit 210 having a content acquiring means, a content ID creating means, and a second learning means. The management server 2 is connected to the scene model database 3, the content model database 4, and the content information database 5. Note that each function of FIG. 4B is implemented as the CPU 101 executes a program stored in the storage unit 104 or the like by using the RAM 103 as a work area. In addition, each function may also be controlled, for example, on the basis of artificial intelligence. Here, the "artificial intelligence" may be based on any artificial intelligence technique known in the art.

<First Acquiring Means 201>

The first acquiring means 201 acquires the first image information from the user terminal 7. The first image information includes equipment or parts photographed by an operator, for example, using a head-mounted display (HMD), a HoloLens, or the like. The photographed image may be transmitted to the management server 2 in real time. Furthermore, the photographed image may be acquired as the first image information.

<First Evaluation Means 202>

The first evaluation means 202 references the scene model database 3. The scene model database 3 stores the past first image information acquired in advance, scene information containing the scene ID associated with the past first image information, and the scene relevance having three or more levels between the past first image information and the scene information. The first evaluation means 202 acquires the scene ID list including the first scene relevance between the first image information and the scene information.

<First Creating Means 203>

The first creating means 203 creates a scene name list corresponding to the scene ID list acquired by the first evaluation means 202. The created scene ID list includes, for example, "scene ID", "scene ID relevance", or the like to list scene IDs having a high relevance with the past first image information. For example, the scene ID is created on the basis of a scene model table of FIG. 5A and a scene content model table (OFE) of FIG. 5B. The scene model table records, for example, the scene ID, the reference ID, and information such as a learning model, and the scene table records the scene ID, the scene name, and the like. The first creating means 203 creates the scene name list on the basis of such information.

<Second Acquiring Means 204>

The second acquiring means 204 acquires, from the user terminal 7, target information containing a set of the second image information and the first scene ID corresponding to the scene name selected from the scene name list.

<Second Evaluation Means 205>

The second evaluation means 205 acquires the reference ID list including the first content relevance between the target information and the reference ID by referencing the content model database 4. The acquired scene ID list includes, for example, "reference ID", "content relevance", and the like to list scene IDs having a high relevance with the target information.

<Second Creating Means 206>

The second creating means 206 is evaluated using the second evaluation means to create a reference summary list corresponding to the acquired reference ID list. The reference summary list is created on the basis of summary information stored in the content table described below.

<Third Acquiring Means 207>

The third acquiring means 207 acquires the first reference ID selected from the reference summary list via the user terminal 7.

<Output Means 208>

The output means 208 outputs contents corresponding to the acquired first reference ID. The acquirement is performed from the content information database 5. The output contents are acquired, for example, by the content table of FIG. 6. The content table is stored, for example, in the content information database 5. For example, the scene ID, the reference ID, the contents, the summary, and hash values are registered in the content table in association with each other. In addition, a single first reference ID is associated with a plurality of pieces of meta-information. For example, the meta-information of FIG. 8 is given to the first reference ID. The meta-information is associated, for example, by a meta-table, a meta-category master table, and a meta-master table.

<Scene ID Creating Unit 209>

The scene ID creating unit 209 has a scene name acquiring means, a scene ID creating means, and a first learning means.

<Scene Name Acquiring Means>

The scene name acquiring means acquires the past first image information acquired in advance and the scene name corresponding to the past first image information by referencing the scene table stored in the scene model database 3.

<Scene ID Creating Means>

The scene ID creating means determines, for example, a character length of the acquired scene name and creates a scene ID having an information amount smaller than that of the scene name of the determined character length for each of the acquired scene names. As a result, the scene ID created here has an information amount smaller than that of the scene name.

<First Training Means>

The first learning means creates the scene model database through machine learning using the scene information containing at least the created scene ID and the past first image information.

<Content ID Creating Unit 210>

The content ID creating unit 210 has a content acquiring means, a content ID creating means, and a second learning means.

<Content Acquiring Means>

The content acquiring means acquires the past second image information acquired in advance and contents corresponding to the past second image information by referencing the content table stored in the content model database 4.

<Content ID Creating Means>

The content ID creating means determines, for example, a character length of a file name of the acquired contents, related information, a text, or the like, and creates a content ID having an information amount smaller than a data capacity of the contents of the determined character length for each of the acquired contents. In addition, the content ID creating means creates the content ID having an information amount smaller than that of the contents for each of the acquired contents. As a result, the content ID created here has an information amount smaller than that of the contents.

<Second Training Means>

The second learning means creates the content model database through machine learning using reference information containing at least the created content ID and the past target information.

<User Terminal 7: Receiving Means>

The receiving means is provided in the user terminal 7 to receive the scene ID list acquired by the first evaluation means. In addition, the receiving means receives the reference ID list acquired by the second acquiring means.

<User Terminal 7: Determination Means>

The determination means is provided in the user terminal 7 to determine whether or not the scene ID contained in the received scene ID list exists in a cache region of the user terminal depending on a result of the receipt of the scene ID list. In addition, the determination means determines whether or not the reference ID contained in the received reference ID list exists in the cache region of the user terminal depending on a result of the receipt of the reference ID list. In addition, the determination means initially checks the list if the scene ID list or the reference ID list exists in the cache region. The cache includes, for example, the name cache table and the summary cache table of FIG. 7.

For example, the scene ID and the scene name are stored in the name cache table in association with each other. In addition, for example, the reference IDs are stored in the summary cache table in association with each other and are referenced.

<User Terminal 7: Query Means>

If there is no scene ID and reference ID in the cache region of the user terminal depending on a result of the determination of the determination means in the user terminal 7, the query means queries the content information database having the contents.

Subsequently, FIG. 5A is a schematic diagram illustrating an exemplary configuration of a scene model table. FIG. 5B is a schematic diagram illustrating an exemplary configuration of a scene content model table (for 0FE).

First, the scene model table of FIG. 5A is stored in the scene model database 3. The scene model table stores a scene ID for identifying, for example, each work performed by an operator in the field and a learning model corresponding to this scene ID in association with each other. There are a plurality of scene IDs, and the learning models of the image information corresponding to each scene are stored in association with the scene IDs.

Subsequently, the scene content model table of FIG. 5B stores reference IDs of each scene ID and the learning models in association with each other. In the scene content model table of FIG. 5B, for example, the reference scene ID is set to, for example, "0FE", and the reference IDs corresponding to each of various scenes are distinguishably stored. There are a plurality of reference IDs, and the learning models of the image information corresponding to each scene are stored in association with the reference IDs. Note that, in some cases, there is no content for the learning model of the image information corresponding to the scene. In this case, for example, "NULL" is stored in the reference ID.

Subsequently, FIG. 6A is a schematic diagram illustrating an exemplary scene table. The scene table of FIG. 6A is stored in the scene model database 3. The scene table stores, for example, an outline of the image information of each work performed by an operator in the field and the scene ID for identifying the work of the outline in association with each other. There are a plurality of scene IDs, and the scene names corresponding to each scene ID are stored in association with the scene IDs.

Subsequently, FIG. 6B is a schematic diagram illustrating an exemplary content table. The content table of FIG. 6A is stored in the content model database 4. The content table stores, for example, the scene ID, the reference ID, the contents, a summary of the contents, and a hash value in association with each other. There are a plurality of scene IDs, and the contents summaries corresponding to each scene ID are stored in association with the scene IDs. The content table stores a plurality of contents for output to the user terminal 7 on the basis of the image information acquired from the user terminal 7. Note that the reference ID may include a content that is not associated with a scene. In this case, the scene ID is set to "NULL".

Subsequently, FIG. 7A is a schematic diagram illustrating an exemplary configuration of the name cache table. FIG. 7B is a schematic diagram illustrating an exemplary configuration of the summary cache table according to this embodiment. The summary cache table is stored in a memory region of the user terminal 7. The user terminal 7 receives, for example, the scene ID list created in the management server 2 and stores it in the memory region. The user terminal 7 references the scene ID list stored in the user terminal 7 and returns the scene name list to the management server 2 on the basis of a result of the referencing, so that it is possible to perform the narrowing with high efficiency.

The user terminal 7 receives, for example, the reference ID list created in the management server 2 and stores it in the memory region. The user terminal 7 references the reference ID list stored in the user terminal 7, and returns the reference ID list to the management server 2 on the basis of a result of the referencing, so that it is possible to perform the narrowing with high efficiency.

Subsequently, FIG. 8A is a schematic diagram illustrating an exemplary configuration of the meta-table. FIG. 8B is a schematic diagram illustrating an exemplary configuration of the meta-category master table. FIG. 8C is a schematic diagram illustrating an exemplary configuration of the meta-master table.

First, the meta-table shown in FIG. 8A is stored in the content model database 4 by associating the reference ID and the meta-ID with each other. In the meta-table, a plurality of meta-IDs may be given to a single content. The meta-category master table shown in FIG. 8B and the meta-master table shown in FIG. 8C are used to manage classifications of the meta-information. For example, instead of information such as "model name" or "series name" which changes depending on the model and the product, information such as "color" or "weight" is selected and stored as an attribute for representing a property of an article itself.

Figure 9:
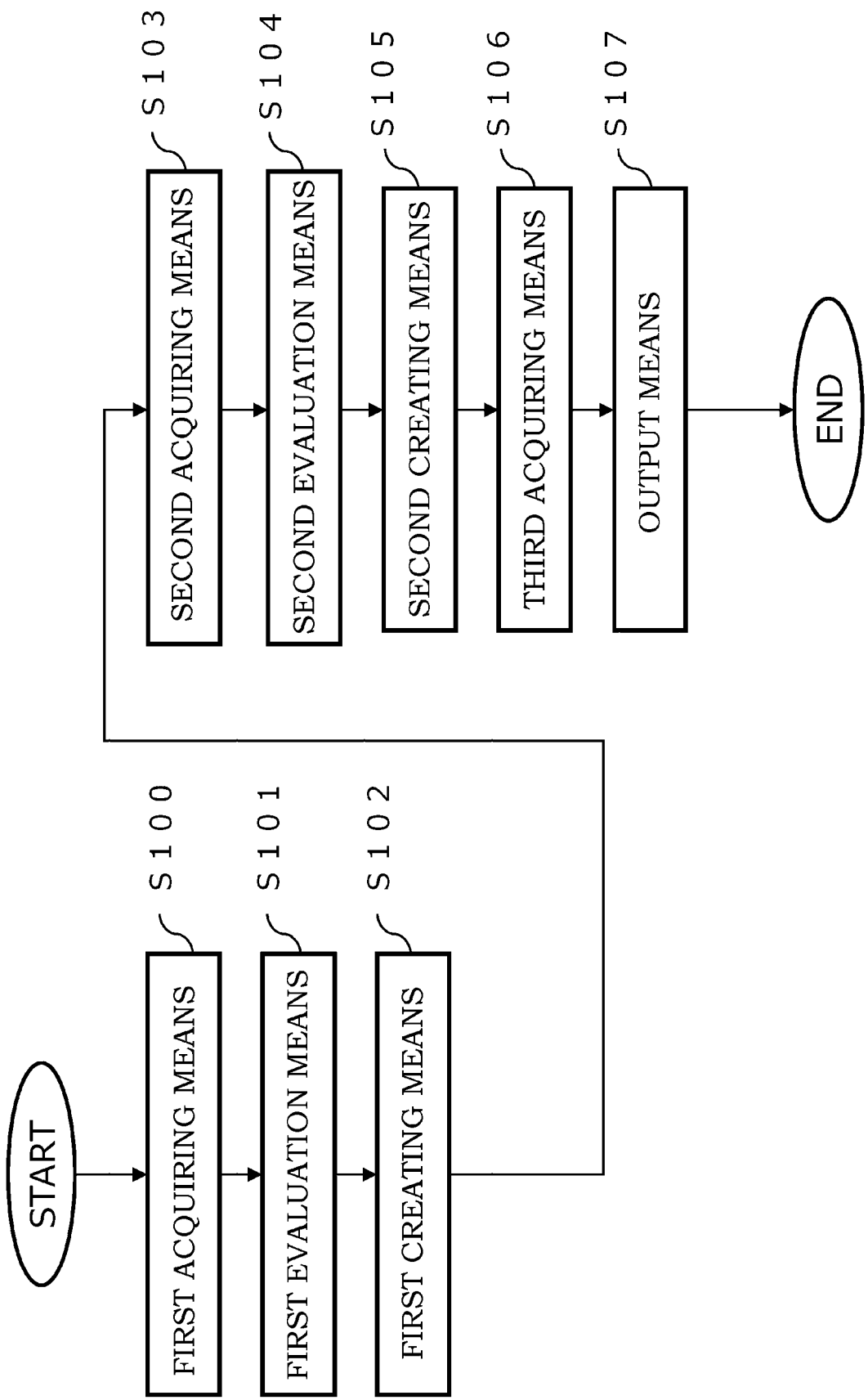
FIG. 9 is a flowchart illustrating an exemplary operation of the information service system according to one embodiment of the invention.

FIG. 9 is a flowchart illustrating an exemplary operation of the information service system 1 according to this embodiment.

<Operation of Information Service System 1>

Next, an exemplary operation of the information service system 1 according to this embodiment will be described. FIG. 9 is a flowchart illustrating an exemplary operation of the information service system 1 according to this embodiment.

<First Acquiring Means S100>

First, the first acquiring means 201 acquires first image information from the user terminal 7 (first acquiring means S100). For example, as illustrated in FIG. 12A, the first acquiring means 201 acquires the image information obtained by photographing the target equipment using the user terminal 7. The first acquiring means 201 may include a plurality of user terminals 7 connected, for example, via the public communication network 6. In this case, the first acquiring means may acquire the first image information along with device identification numbers of each user terminal 7.

<First Evaluation Means S101>

The first evaluation means 202 references the scene model database 3. The scene model database 3 stores past first image information acquired in advance, scene information containing the scene ID associated with the past first image information, and a scene relevance having three or more levels between the past first image information and the scene information, and acquires a scene ID list including a first scene relevance between the acquired first image information and the scene information. The scene ID is, for example, a list of the data acquired from the scene table shown in FIG. 6A.

<First Creating Means S102>

The first creating means 203 creates a scene name list on the basis of the scene name list corresponding to the scene ID list acquired in the first evaluation means 202. The first creating means 203 creates the corresponding scene name list, for example, by referencing the scene table shown in FIG. 6A. For example, if the scene ID included in the scene ID list acquired in the first evaluation means 202 is "OFD", a scene name "reactivation of ABC-999 device" is selected. For example, if the scene ID is "OFE", a scene name "remove memory of ABC-999 device" is selected.

<Second Acquiring Means S103>

Then, the second acquiring means 204 acquires, from the user terminal 7, target information containing a set of the second image information and the first scene ID corresponding to the scene name selected from the scene name list. For example, as illustrated in FIG. 12B, the second acquiring means 204 acquires target information containing a set of the scene name (device D) selected by the user terminal 7 and the first scene ID corresponding to the scene name.

<S104>

The second evaluation means 205 acquires the reference ID list including the first content relevance between the target information and the reference ID by referencing the content model database 4. The reference ID list is, for example, a list of information such as the reference ID and the content relevance.

<Second Creating Means S105>

The second creating means 206 creates a reference summary list corresponding to the reference ID list acquired by the second evaluation means 205. The reference summary list is created, for example, by acquiring a summary corresponding to the reference ID from the content table of FIG. 6B on the basis of the reference ID. For example, if the reference ID is "1B827-02", the corresponding summary is "step 1: remove four corner screws, and pull . . . ". In addition, this reference ID summary list may be recorded, for example, in the cache region of the user terminal 7.

<Third Acquiring Means S106>

The third acquiring means 207 acquires the first reference ID selected from the reference summary list via the user terminal 7. The third acquiring means 207 receives, for example, only the target reference ID. In this configuration, it is possible to compress an information transmission amount between the user terminal 7 and the management server 2. For example, as illustrated in FIG. 12C, the third acquiring means 207 acquires the first reference ID ("disassembling procedure 1: remove four corner screws, and pull . . . ") selected from the reference summary list from the user terminal 7.

<Output Means S107>

The output means 208 outputs the content corresponding to the acquired first reference ID. The output means 208 acquires the content from the content information database 5 and outputs it to the user terminal 7. As illustrated in FIG. 5, for example, if the reference ID is "1B827-02", the output content becomes "1B827-02/1.pdf". This file is output to the user terminal 7. As the output of the user terminal 7, for example, the content selected from the reference summary list corresponding to the first reference ID is output to the user terminal 7 as illustrated in FIG. 12D.

As a result, the operation of the information service system 1 according to this embodiment is terminated.

Figure 10B:
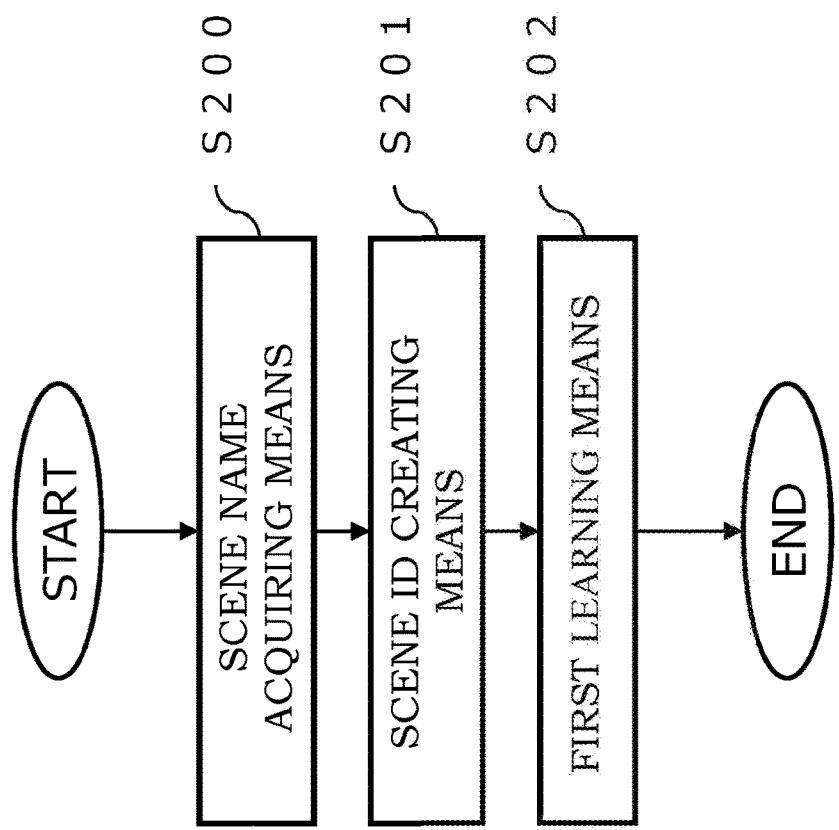
FIG. 10B is a flowchart illustrating an exemplary operation of a content ID creating unit according to one embodiment of the invention.
Figure 10A:
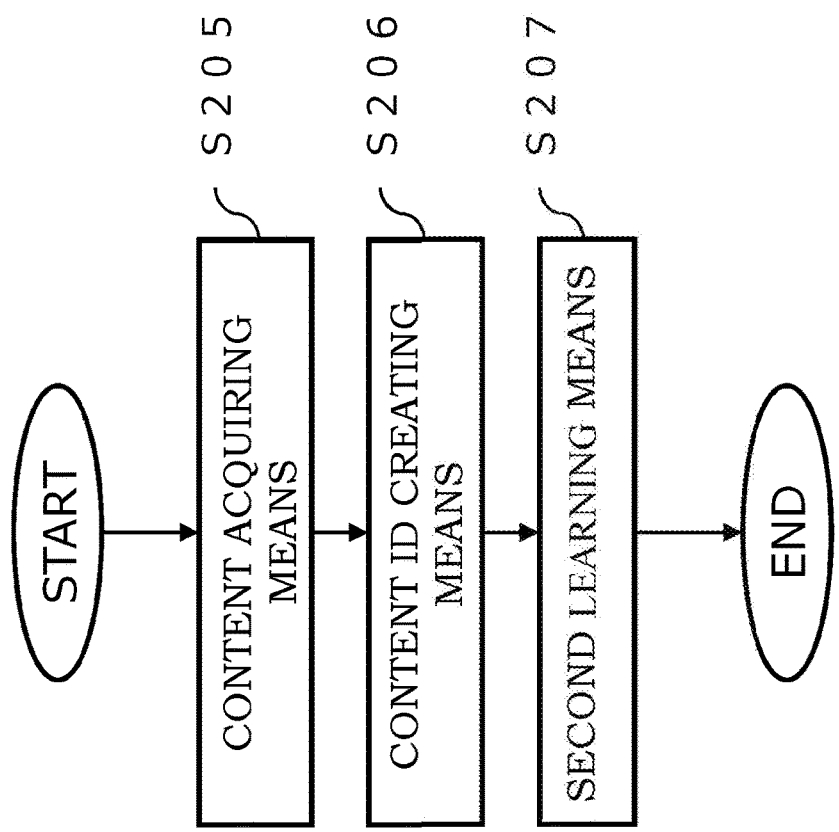
FIG. 10A is a flowchart illustrating an exemplary operation of a scene ID creating unit according to one embodiment of the invention.

FIG. 10A is a flowchart illustrating an exemplary operation of the scene ID creating unit according to this embodiment. FIG. 10B is a flowchart illustrating an exemplary operation of the content ID creating unit according to this embodiment.

<Operation of Scene ID Creating Unit>

First, FIG. 10A is a flowchart illustrating an exemplary operation of the scene ID creating unit according to this embodiment.

The scene ID creating unit includes a scene name acquiring means S200, a scene ID creating means S201, and a first learning means S202.

<Scene Name Acquiring Means S200>

The scene name acquiring means S200 acquires the past first image information acquired in advance and the scene name corresponding to the past first image information from the scene model database 3.

<Scene ID Creating Means S201>

The scene ID creating means S201 creates a scene ID having an information amount smaller than that of the scene name for each scene name acquired using the scene name acquiring means S200.

<First Training Means S202>

The first learning means S202 creates the scene model database 3 through machine learning using the scene information containing the scene ID and the past first image information.

<Operation of Content ID Creating Unit>

Subsequently, FIG. 10B is a flowchart illustrating an exemplary operation of the content ID creating unit according to this embodiment.

The content ID creating unit includes a content name acquiring means S205, a content ID creating means S206, and a second learning means S207.

<Content Acquiring Means S205>

The content acquiring means S205 acquires the past second image information acquired in advance and the content corresponding to the past second image information from the content model database 4.

<Content ID Creating Means S206>

The content ID creating means S206 creates the content ID having an information amount smaller than that of the content for each of the contents acquired in the content acquiring means S205.

<Second Training Means S207>

The second learning means S207 creates the content model database through machine learning using the reference ID including at least the content ID and the past target information.

Figure 11:
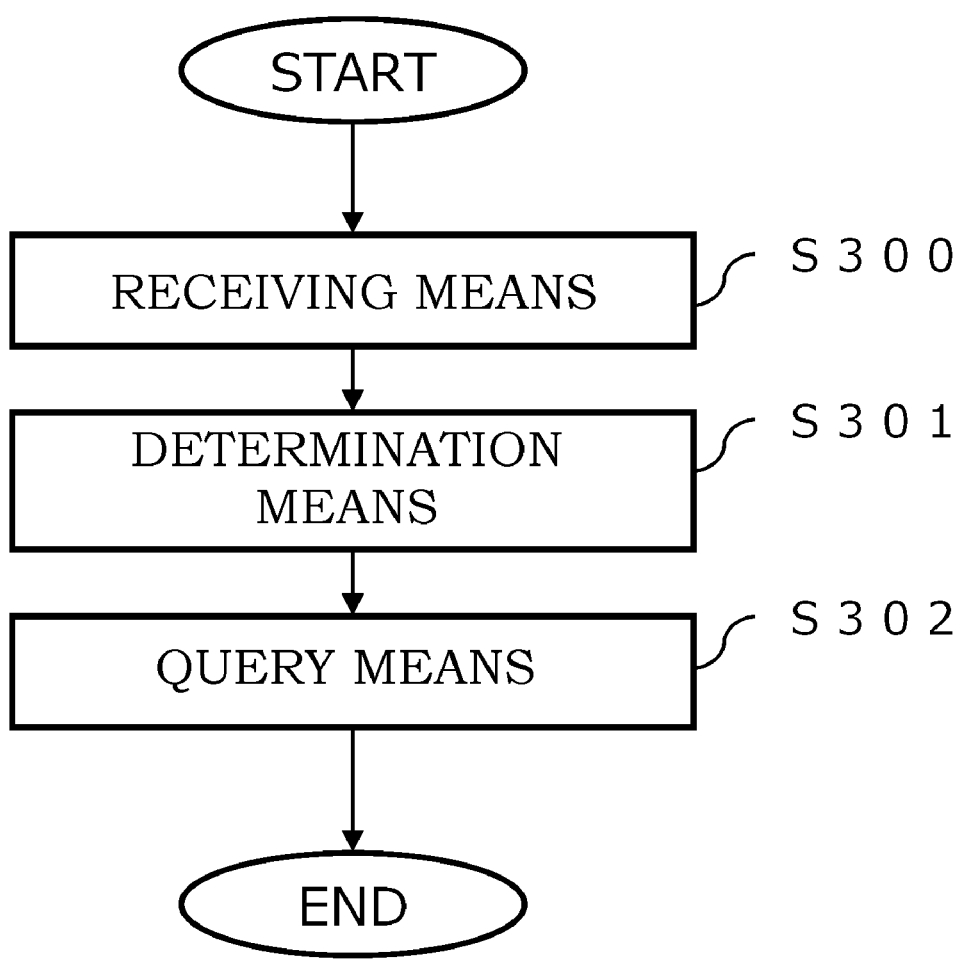
FIG. 11 is a flowchart illustrating an exemplary cache region check operation in a user terminal according to one embodiment of the invention.

FIG. 11 is a flowchart illustrating an exemplary cache region check operation in the user terminal according to this embodiment.

<Receiving Means S300>

The receiving means S300 receives the scene ID list acquired by the first evaluation means 202 or the reference ID list acquired by the second acquiring means.

<Determination Means S301>

The determination means S301 determines whether or not the scene ID included in the scene ID list received by the receiving means S300 exists in the cache region of the user terminal 7 or whether or not the reference ID included in the received reference ID list exists.

<Query Means S302>

If the scene ID or the reference ID does not exist in the cache region of the user terminal 7 as a result of the determination means S301, the query means S302 queries the content information database 5 having the content.

As a result, it is possible to efficiently provide suitable information using the user terminal 7 and the content information database 5.

According to this embodiment, the scene ID creating means and the content ID creating means can create IDs having an information amount smaller than those of the scene name and the contents. For this reason, it is possible to suppress an information amount between the user terminal 7 and the management server 2. As a result, it is possible to improve a narrowing response between the user terminal 7 and the management server 2. In addition, only the target ID may be corrected when one of the databases is updated in order to enable exchange of a newly created ID. That is, it is not necessary to update the other database. As a result, it is possible to shorten the updating time and reduce time and man hours taken for maintenance, repair, or the like of the equipment in the field.

According to this embodiment, the scene ID creating unit has the scene name acquiring means, the scene ID creating means, and the first learning means. For this reason, it is possible to acquire the scene name stored in the scene model database 3 and create the scene ID having an information amount smaller than that of the scene name for each scene name. As a result, it is possible to save a communication load for the exchange and respond quickly. In addition, the created scene ID is stored in the scene table shown in FIG. 6A. The scene ID is associated with information relating to the content of the content table shown in FIG. 6B. As a result, when the scene table of the scene model database 3 is updated, only the target ID may be corrected, and it is not necessary to update the other content model database 4.

According to this embodiment, the content ID creating unit 210 has the content acquiring means, the content ID creating means, and the second learning means. For this reason, it is possible to acquire the content stored in the content model database 4 and create the reference ID having an information amount smaller than that of the content for each content name. As a result, it is possible to save the communication load for the exchange and respond quickly. In addition, the created reference ID is stored in the content table shown in FIG. 6B. The reference ID is associated with the meta-information of the meta-table shown in FIG. 8A. As a result, when the content table of the content model database 4 is updated, only the target ID may be corrected, and it is not necessary to update the other meta-table.

According to this embodiment, the user terminal 7 may have a display unit mounted on a head or eyeglasses to display information created on the basis of the first image information acquired from the user terminal in a transparent state. For this reason, it is possible to perform information narrowing using the first image information acquired in the management server 2 on the basis of the photographed image information. The acquired first image information is exchanged with the management server 2 depending on a manipulation on the user terminal 7. For example, the manipulation may include a gesture or a voice command. The manipulation is executed in cooperation between the user terminal 7 and the management server 2. As a result, it is possible to efficiently acquire and provide suitable information.

According to this embodiment, the contents output from the output means 208 to the user terminal 7 may include any information such as a part or all of text, illustration, video, or sound. For this reason, it is possible to directly utilize existing information assets. As a result, it is possible to provide various contents. As a result, it is possible to provide optimum information out of the existing information assets.

According to this embodiment, an information service method for narrowing a plurality of contents output from the management server 2 to the user terminal on the basis of the image information acquired from the user terminal 7 includes a first process for performing a first acquiring means, a second process for storing information in the scene model database 3, a third process for performing a first evaluation means, a fourth process for performing a first creating means, a fifth process for performing a second acquiring means, a sixth process for storing information in the content model database 4, a seventh process for performing a second evaluation means, an eighth process for performing a second creating means, a ninth process for performing a third creating means, and a tenth process for performing an output means.

For this reason, it is not necessary to create a learning model whenever the information is newly associated. Therefore, it is possible to efficiently provide suitable information without consuming time and cost. As a result, it is possible to narrow the state depending on a situation of the field and directly utilize the existing information asset. Furthermore, it is possible to provide optimum information out of the existing information assets.

While the embodiments of the present invention have been described, each embodiment is provided by way of example and is not intended to limit the scope of the invention. The embodiments may be embodied in a variety of other forms, and various omissions, substitutions, or changes may be possible to without departing from the spirit and scope of the invention. The embodiments and their modifications constitute the scope or gist of the invention and encompass the inventions described in claims and their equivalents.

REFERENCE SIGNS LIST

1: information service system
2: management server
3: scene model database
4: content model database
5: content information database
6: public communication network
7: user terminal
101: CPU
102: ROM
103: RAM
104: storage unit
105 to 107: I/F
108: input part
109: output part
110: internal bus
201: first acquiring means
202: first evaluation means
203: first creating means
204: second acquiring means
205: second evaluation means
206: second creating means
207: third acquiring means
208: output means
209: scene ID creating unit
210: content ID creating unit

The invention claimed is:

1. An information service system for narrowing a plurality of contents for output to a user terminal on a basis of image information acquired from the user terminal, the information service system comprising:
a first acquiring unit configured to acquire first image information from the user terminal;
a scene model database configured to store past first image information acquired in advance, scene information containing a scene ID associated with the past first image information, and a scene relevance having at least three levels between the past first image information and the scene information;
a first evaluation unit configured to acquire a scene ID list including a first scene relevance between the first image information and the scene information by referencing the scene model database;
a first creating unit configured to create a scene name list corresponding to the scene ID list;
a second acquiring unit configured to acquire target information from the user terminal, the target information containing a set of second image information and a first scene ID corresponding to a scene name selected from the scene name list;
a content model database configured to store past target information containing a set of past second image information acquired in advance and a scene ID, a reference ID that is associated with the past target information and corresponds to the content, and a content relevance having at least three levels between the past target information and the reference ID;
a second evaluation unit configured to acquire a reference ID list including a first content relevance between the target information and the reference ID by referencing the content model database;
a second creating unit configured to create a reference summary list corresponding to the reference ID list;
a third acquiring unit configured to acquire a first reference ID selected from the reference summary list via the user terminal; and
an output unit configured to output the content corresponding to the acquired first reference ID.

2. The information service system according to claim 1, further comprising a scene ID creating unit, the scene ID creating unit having:
a scene name acquiring unit configured to acquire the past first image information acquired in advance and a scene name corresponding to the past first image information,
a scene ID creating unit configured to create the scene ID having an information amount smaller than that of the scene name for each of the acquired scene names, and
a first learning unit configured to create the scene model database through machine learning using the scene information and the past first image information.

3. The information service system according to claim 2, further comprising a content ID creating unit, the content ID creating unit having:
   a content acquiring unit configured to acquire the past second image information acquired in advance and the content corresponding to the past second image information,
   a content ID creating unit configured to create a content ID having an information amount smaller than that of the content for each of the acquired contents, and
   a second learning unit configured to create the content model database through machine learning using reference information containing at least the content ID and the past target information.

4. The information service system according to claim 2, wherein the user terminal further includes:
   a receiving unit configured to receive the scene ID list acquired by the first evaluation unit;
   a determination unit configured to determine whether a scene ID included in the received scene ID list exists in a cache region of the user terminal depending on a result of receipt of the scene ID list; and
   a query unit configured to query a content information database having the content if the scene ID included in the received scene ID list does not exist in the cache region of the user terminal depending on a result of the determination.

5. The information service system according to claim 2, wherein the user terminal further includes:
   a receiving unit configured to receive the reference ID list acquired by the second acquiring unit;
   a determination unit configured to determine whether a reference ID included in the received reference ID list exists in the cache region of the user terminal depending on a result of receipt of the reference ID list; and
   a query unit configured to query a content information database having the contents if the reference ID included in the received reference ID list does not exist in the cache region of the user terminal depending on a result of the determination.

6. The information service system according to claim 2, wherein the user terminal includes a display unit mounted on a head or eyeglasses to display information created on the basis of the first image information acquired from the user terminal in a transparent state.

7. The information service system according to claim 1, further comprising a content ID creating unit, the content ID creating unit having:
   a content acquiring unit configured to acquire the past second image information acquired in advance and the content corresponding to the past second image information,
   a content ID creating unit configured to create a content ID having an information amount smaller than that of the content for each of the acquired contents, and
   a second learning unit configured to create the content model database through machine learning using reference information containing at least the content ID and the past target information.

8. The information service system according to claim 7, wherein the content ID is associated with a plurality of pieces of meta-information.

9. The information service system according to claim 8, wherein the user terminal further includes:
   a receiving unit configured to receive the scene ID list acquired by the first evaluation unit;
   a determination unit configured to determine whether a scene ID included in the received scene ID list exists in a cache region of the user terminal depending on a result of receipt of the scene ID list; and
   a query unit configured to query a content information database having the content if the scene ID included in the received scene ID list does not exist in the cache region of the user terminal depending on a result of the determination.

10. The information service system according to claim 8, wherein the user terminal further includes:
   a receiving unit configured to receive the reference ID list acquired by the second acquiring unit;
   a determination unit configured to determine whether a reference ID included in the received reference ID list exists in the cache region of the user terminal depending on a result of receipt of the reference ID list; and
   a query unit configured to query a content information database having the contents if the reference ID included in the received reference ID list does not exist in the cache region of the user terminal depending on a result of the determination.

11. The information service system according to claim 8, wherein the user terminal includes a display unit mounted on a head or eyeglasses to display information created on the basis of the first image information acquired from the user terminal in a transparent state.

12. The information service system according to claim 7, wherein the user terminal further includes:
   a receiving unit configured to receive the scene ID list acquired by the first evaluation unit;
   a determination unit configured to determine whether a scene ID included in the received scene ID list exists in a cache region of the user terminal depending on a result of receipt of the scene ID list; and
   a query unit configured to query a content information database having the content if the scene ID included in the received scene ID list does not exist in the cache region of the user terminal depending on a result of the determination.

13. The information service system according to claim 7, wherein the user terminal further includes:
   a receiving unit configured to receive the reference ID list acquired by the second acquiring unit;
   a determination unit configured to determine whether a reference ID included in the received reference ID list exists in the cache region of the user terminal depending on a result of receipt of the reference ID list; and
   a query unit configured to query a content information database having the contents if the reference ID included in the received reference ID list does not exist in the cache region of the user terminal depending on a result of the determination.

14. The information service system according to claim 7, wherein the user terminal includes a display unit mounted on a head or eyeglasses to display information created on the basis of the first image information acquired from the user terminal in a transparent state.

15. The information service system according to claim 1, wherein the user terminal further includes:
   a receiving unit configured to receive the scene ID list acquired by the first evaluation unit;
   a determination unit configured to determine whether a scene ID included in the received scene ID list exists in a cache region of the user terminal depending on a result of receipt of the scene ID list; and a query unit configured to query a content information database having the content if the scene ID included in the received scene ID list does not exist in the cache region of the user terminal depending on a result of the determination.

16. The information service system according to claim 15, wherein the user terminal further includes:
   a receiving unit configured to receive the reference ID list acquired by the second acquiring unit;
   a determination unit configured to determine whether a reference ID included in the received reference ID list exists in the cache region of the user terminal depending on a result of receipt of the reference ID list; and
   a query unit configured to query a content information database having the contents if the reference ID included in the received reference ID list does not exist in the cache region of the user terminal depending on a result of the determination.

17. The information service system according to claim 1, wherein the user terminal further includes:
   a receiving unit configured to receive the reference ID list acquired by the second acquiring unit;
   a determination unit configured to determine whether a reference ID included in the received reference ID list exists in the cache region of the user terminal depending on a result of receipt of the reference ID list; and
   a query unit configured to query a content information database having the contents if the reference ID included in the received reference ID list does not exist in the cache region of the user terminal depending on a result of the determination.

18. The information service system according to claim 1, wherein the user terminal includes a display unit mounted on a head or eyeglasses to display information created on the basis of the first image information acquired from the user terminal in a transparent state.

19. The information service system according to claim 1, wherein the content includes at least information regarding any of a part or all of text, illustration, video, or sound.

20. An information service method for narrowing a plurality of contents for output to a user terminal on a basis of image information acquired from the user terminal, the information service method comprising:
   a first process for acquiring first image information from the user terminal;
   a second process for storing, in a scene model database, past first image information acquired in advance, scene information containing a scene ID associated with the past first image information, and a scene relevance having at least three levels between the past first image information and the scene information;
   a third process for acquiring a scene ID list including a scene relevance between the first image information and the scene ID by referencing the scene model database;
   a fourth process for creating a scene name list corresponding to the scene ID list;
   a fifth process for acquiring target information containing a set of second image information and a first scene ID corresponding to a scene name selected from the scene name list from the user terminal;
   a sixth process for storing, in a content model database, the past target information containing a set of past second image information acquired in advance and a scene ID, a reference ID that is associated with the target information and corresponds to the content, and a content relevance having at least three levels between the past target information and the reference ID;
   a seventh process for acquiring a reference ID list including a first content relevance between the target information and the reference ID by referencing the content model database;
   an eighth process for creating a reference summary list corresponding to the reference ID list;
   a ninth process for acquiring a first reference ID selected from the reference summary list via the user terminal; and
   a tenth process for outputting the content corresponding to the acquired first reference ID.

* * * * *